(No Model.) 2 Sheets—Sheet 1.

A. T. STEARNS.
SHINGLE EDGING MACHINE.

No. 427,128. Patented May 6, 1890.

Witnesses
Martha J. Jackson
George F. Piper

Inventor
Albert T. Stearns
by Alban Andrén
his att.

(No Model.) 2 Sheets—Sheet 2.

A. T. STEARNS.
SHINGLE EDGING MACHINE.

No. 427,128. Patented May 6, 1890.

Witnesses: Inventor:

UNITED STATES PATENT OFFICE.

ALBERT T. STEARNS, OF BOSTON, MASSACHUSETTS.

SHINGLE-EDGING MACHINE.

SPECIFICATION forming part of Letters Patent No. 427,128, dated May 6, 1890.

Application filed October 21, 1889. Serial No. 327,610. (No model.)

*To all whom it may concern:*

Be it known that I, ALBERT T. STEARNS, a citizen of the United States, and a resident of Boston, in the county of Suffolk and State of Massachusetts, have invented new and useful Improvements in Shingle-Edging Machines, of which the following, taken in connection with the accompanying drawings, is a specification.

This invention relates to improvements in shingle-edging machines; and it has for its object to trim the side edges of shingles parallel with each other and at right angles to the butt and point. In so trimming the edges the shingles may be cut to any desired dimensions, according to the size of the blanks, or merely trimmed or edged on one or both side edges, so as to make such side edges parallel and at right angles to the butt and point, irrespective of any particular standard width of the shingles, as will hereinafter be more fully shown and described, reference being had to the accompanying drawings, in which—

Figure 1:
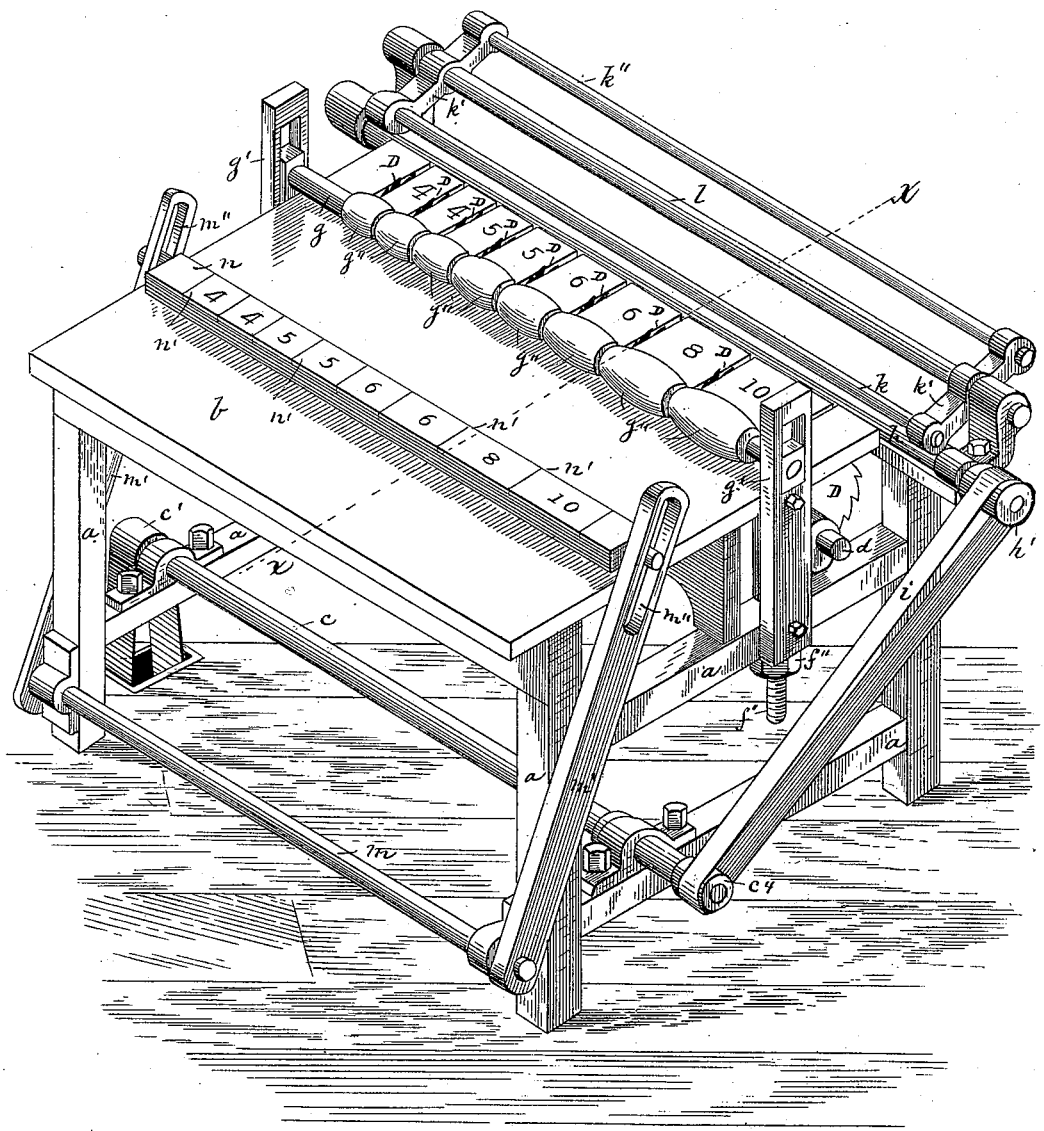
Figure 2:
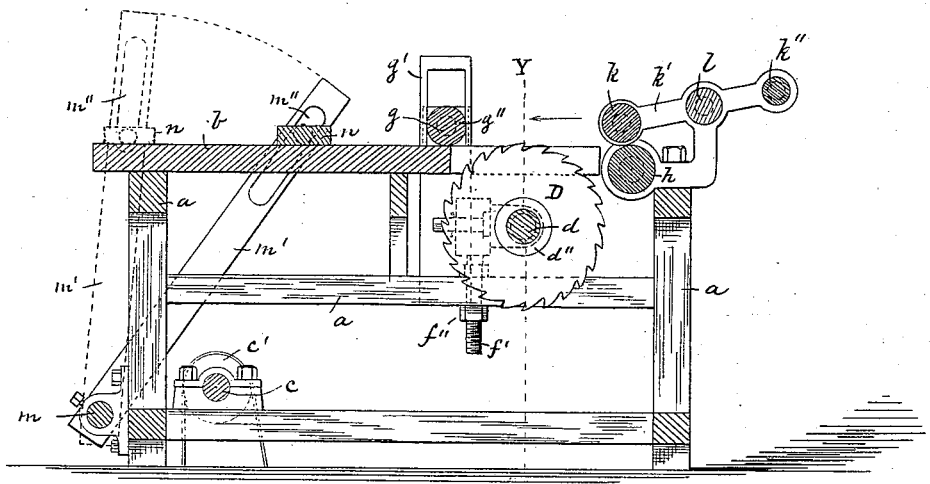
Figures 3, 4:
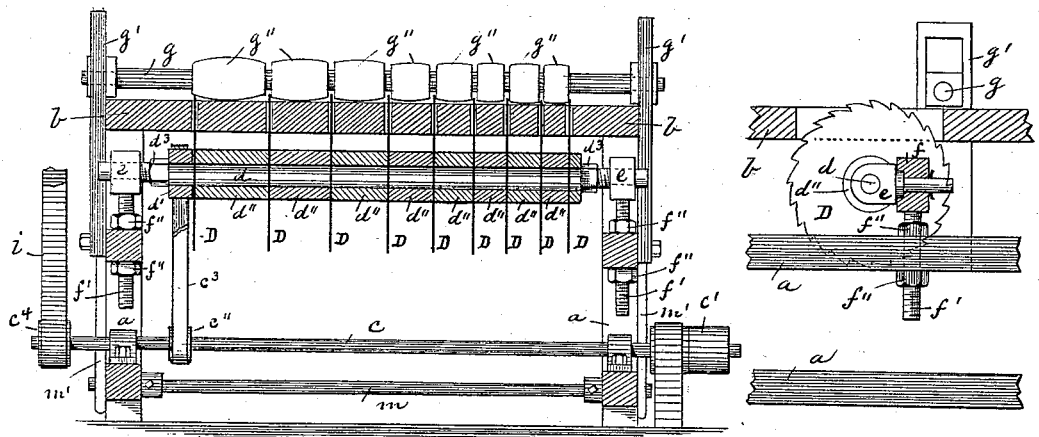

Figure 1 represents a perspective view of the improved machine. Fig. 2 represents a longitudinal section on the line X X shown in Fig. 1. Fig. 3 represents a cross-section on the line Y Y shown in Fig. 2; and Fig. 4 represents a detail view of one of the swivel-bearings for the rotary saw-shaft.

Similar letters refer to similar parts wherever they occur on the different parts of the drawings.

The machine consists of a suitable frame $a$, made of wood or metal, and having secured to its top the work-supporting table $b$, as shown. In bearings in the frame $a$ is journaled the shaft $c$, having secured to it a pulley $c'$, to which a rotary motion is imparted by means of belt-power, as usual. $c''$ is another pulley on said shaft, from which a rotary motion is imparted by means of a belt $c^3$ to the pulley $d'$ on the saw-spindle $d$. To said spindle $d$ are secured in a suitable manner at proper distances apart a series of circular saws, D D D, projecting through slits in the table $b$, as shown. Said saws D are preferably splined on the shaft $d$, and between them are located on said shaft intermediate annular blocks $d''$ or dividers, which, with the saws, are secured to the shaft by means of nuts $d^3$ $d^3$, as is common in gang-saw devices of this kind.

The ends of the saw-spindle $d$ are journaled in bearings $e$ $e$, each of which is swiveled in a vertically-adjustable block $f$, having a screw-threaded shank $f'$ going freely through a vertical perforation in the frame $a$ and made adjustable therein by means of check-nuts $f''$ $f''$, as shown. The object of said swivel-bearings is to enable the operator to vertically adjust each end of the saw-shaft more or less, according to the wear of the rotary saws, and to secure the shanks of such bearings to the frame of the machine after being adjusted. By having the said shaft $d$ arranged in swivel-bearings, as described, it will be caused to rotate without much frictional resistance and run freely in its bearings, even if one of the latter should be slightly higher or lower than the other.

In front of the rotary saws D is arranged the spindle $g$, which is vertically adjustable in slotted guides $g'$ $g'$, secured to the frame of the machine, as shown. To said spindle is secured or made in one piece with it a series of convex collars $g''$, each one being of a width equal to or about equal to the distance between the saws behind it, as shown. Said shaft and convex collars by their weight serve to hold the shingles against the table $b$ while they are being fed toward the rotary saws D.

By having the collars $g''$ made convex the shingle may be fed beneath either of them, with the middle or crowning part of such collar pressing midway on the shingle, thus causing it to be guided properly forward in a direction parallel to the saws.

Back of the saws D is journaled in bearings attached to or forming a part of the frame $a$ the feed-roller $h$, which is set in a rotary motion by means of a belt $i$, leading from a pulley $c^4$ on the driving-shaft $c$ to a pulley $h'$ on the end of said feed-roller $h$, as shown. In combination with such rotary feed-roller I use an upper yielding roller $k$, which is loosely journaled in the rocker-arms $k'$ $k'$, secured to the spindle $l$, preferably journaled in bearings on the frame $a$; or said rocker-arms may be journaled on said spindle, and the latter held stationary without departing from the essence of my invention.

The arms $k'$ $k'$ are preferably extended beyond the spindle $l$ and united by means of a stay-rod $k''$, as shown.

During the operation of the machine, after the pointed ends of the shingles have passed by and between the saws they enter between the feed-roller $h$ and the yielding roller $k$, causing the shingles to be fed onward and automatically delivered from the machine.

In bearings attached to the lower front part of the frame $a$ is located a shaft $m$, to the ends of which are secured the upwardly-projecting arms $m'$ $m'$, one on each side of the table $b$. Said arms $m'$ $m'$ have slots $m''$ $m''$ in their upper ends, adapted to receive the cylindrical ends of the feed or push bar $n$, resting loosely on top of the table $b$, as shown. In practice I prefer to make division marks or lines $n'$ $n'$ on said push-bar, which lines correspond with and are arranged in lines opposite to the respective saws D D, as shown, so as to serve as aids for the operator in placing the shingles in front of the push-bar $n$, and feeding them forward to the action of the said saws D D.

In practice the saws D D may be located at various distances from each other on the spindle $d$, as shown, so as to trim the edges of the shingles to standard dimensions—such as four, five, six, or more inches in width, as may be desired.

In the operation of the machine the saw-shaft and its saws and the feed-roller $h$ are rotated, as desired. The operator stands in front of the machine, and after having moved the push-bar $n$ towards the front end of the table $b$ he places a shingle on said table with its butt-end resting against the push-bar. In placing a shingle in position in front of the push-bar the operator must determine what width it can be trimmed or edged and place the said shingle opposite to the marks on the push-bar corresponding to the width between the saws and the width of the finished shingle. The shingle is then pushed forward by means of the bar $n$, its pointed end being passed below one of the collars $g''$ on the spindle $g$, by which the shingle is held against the top of the table $b$ as it is moved onward to be acted on by the saws. By pushing the shingle a little farther onward, its pointed end passes between the rotary feed-roller $h$ and the loose weighted roller $k$, by which the shingle is automatically fed forward between the saws and delivered in a finished state from the machine.

The machine is particularly designed for trimming both edges of dimension-shingles at one operation; but it may also be used for trimming and squaring one edge only of shingles should the other edge happen to be properly trimmed. By this means the shingle is properly edged and trimmed to standard sizes with parallel sides at right angles to the butt and pointed ends, thus saving much time and labor in the subsequent art of roofing the buildings to be shingled.

Having thus fully described the nature, construction, and operation of my invention, I wish to secure by Letters Patent and claim—

1. In an edging-machine, one or more circular saws secured to a rotary shaft, and a movable push-bar for feeding the work to the saws, combined with a vertically-yielding convex roller for holding the work on the table, a rotary feed-roller $h$, and the yielding roller $k$, substantially as and for the purpose set forth.

2. In an edging-machine, the rotary saws D D and table $b$, combined with the movable push-bar $n$, vertically-yielding convex roller $g$ $g''$, the rotary feed-roller $h$ and the yielding weighted loose roller $k$, substantially as and for the purpose set forth.

In testimony whereof I have signed my name to this specification, in the presence of two subscribing witnesses, on this 9th day of October, A. D. 1889.

ALBERT T. STEARNS.

Witnesses:
ALBAN ANDRÉN,
MARTHA J. JACKSON.